United States Patent [19]

Martin

[11] Patent Number: 5,101,209

[45] Date of Patent: Mar. 31, 1992

[54] JAM STROBE RESOLUTION USING A MONOPULSE ANTENNA

[75] Inventor: Raymond G. Martin, Ellicott City, Md.

[73] Assignee: The United States of America as represented by the Secretary of the Air Force, Washington, D.C.

[21] Appl. No.: 491,030

[22] Filed: Mar. 9, 1990

[51] Int. Cl.⁵ ........................ G01S 13/44; G01S 7/36
[52] U.S. Cl. ...................................... 342/152; 342/17
[58] Field of Search .................... 342/152, 17, 13, 149

[56] References Cited

U.S. PATENT DOCUMENTS

| | | | |
|---|---|---|---|
| 4,042,927 | 8/1977 | Helms | 342/13 |
| 4,107,682 | 8/1978 | Boucher et al. | 342/17 |
| 4,219,816 | 8/1980 | Schenkel et al. | 342/149 X |
| 4,296,415 | 10/1981 | Pelton et al. | 342/149 X |
| 4,331,458 | 5/1982 | Lacomme | 342/152 |
| 4,486,756 | 12/1984 | Peregrim et al. | 342/149 |
| 4,549,183 | 10/1985 | Farina | 342/17 |
| 4,573,051 | 2/1986 | Farina | 342/17 |
| 4,646,095 | 2/1987 | Kanter | 342/149 |

OTHER PUBLICATIONS

Samuel M. Sherman, "Monopulse Principles and Techniques", Atech House, Chapter 8, Response to Unresolved Targets.

Sabi J. Asseo, Detection of Target Multiplicity Using Monopulse Quadrature Angle, IEEE Trans. AES-17, No. 2, Mar. 1981, pp. 271-280.

Primary Examiner—Gilberto Barrón, Jr.
Attorney, Agent, or Firm—Bernard E. Franz; Donald J. Singer

[57] ABSTRACT

In a surveillance radar, a process is disclosed which can determine the angular positions of multiple jammers with the use of a monopulse agile beam antenna. It involves collecting and processing jammer data received via a monopulse antenna, in order to determine jammer location, and to resolve two jammers within the main beam when present. A feature is the use of the ratio of the imaginary and real parts of the difference/sum ratio as a discriminant to select a subset of multiple measurement data points, from which the individual jammer angular locations can be determined, when two jammers are present, by averaging upper and lower percentiles of the real difference/sum ratio data points of that subset.

2 Claims, 4 Drawing Sheets

JAM STROBE RESOLUTION USING A MONOPULSE ANTENNA

RIGHTS OF THE GOVERNMENT

The invention described herein may be manufactured and used by or for the Government of the United States for all governmental purposes without the payment of any royalty.

BACKGROUND OF THE INVENTION

The present invention relates generally to jam strobe resolution in a radar system using a monopulse antenna.

The generation of jam strobes, that is the determination of jammers' angular positions, is a typical requirement for surveillance radars. When multiple jammers are present, and this is typical of current specified threats, the issue of jammer resolution obviously arises. Techniques have been developed and applied to deal with this problem for the fixed beam type of mechanically scanning surveillance radars that are in common use today. These techniques generally depend on recognition of the scan modulated jammer power pattern that is generated as the antenna scans past the jammer or jammers. These methods are not suitable for the type of agile beam radars being considered for future surveillance radars that will use electronic step scan and are either totally static mechanically or, if they are rotating, spend only brief dwells in any particular direction. In these cases scan modulation is either non-existent or of too little extent to be of value for resolution purposes. Such radars, in general, will employ monopulse angle measurement capabilities, which actually enhance their ability to generate accurate jam strobes on individual jammers, but which cause problems when it is necessary to resolve closely spaced jammers. There is need for an approach to dealing with these problems and providing a jam strobe resolution capability for monopulse antennas when there are two jammers in the main beam.

It is perhaps worth pointing out that the typical race track stand-off jammer threat frequently produces pairs of closely spaced jammers as they cross one another in the front and back legs of the race track. More than two closely spaced jammers are much less likely to occur.

It is well known (Samuel M. Sherman, "Monopulse Principles and Techniques", Artech House, Chapter 8, Response to Unresolved Targets) that when two fluctuating sources are present within the coverage of a monopulse antenna, the average, or weighted average, of the indicated angle is at the so-called "power centroid" of the two sources. On the other hand, if one source is consistently stronger than the other, the unweighted average indicated angle is that of the stronger source.

Another well-known characteristic of monopulse systems is that the presence of multiple, rather than single, sources within the coverage can be detected (Sabi J. Asseo, Detection of Target Multiplicity using Monopulse Quadrature Angle, IEEE Trans. AES-17, No. 2, March 1981, pp. 271-280) by the measurement of the imaginary part of the difference/sum ratio $Im(d/s)$, as well as the real part, $Re(d/s)$. $Re(d/s)$ is normally used to calculate the source angle, via the appropriate d/s vs. angle calibration relationship. However, if $Im(d/s)$ is large under high signal-to-noise ratio conditions, the presence of multiple sources is indicated and $(Re(d/s)$ is not a good direct measure of their locations.

United States patents of interest include U.S. Pat. No. 4,646,095, to Kanter, which discloses a method of resolving with a monopulse antenna the signals from two sources in the sum beam of the antenna. Those sources may be jammers. This is done in the patent using the ratios of the sum and difference signals. A monopulse radar for resolving jammers is also shown in U.S. Pat. No. 4,042,927 to Helms. U.S. Pat. No 4,107,682 to Boucher et al is concerned with a system including a monopulse antenna along with the combination of sum and difference signals for overcoming the effect of electronic countermeasures. Sum and difference signals along with cross-related or cross term signals are used by Schenkel et al in U.S. Pat. No. 4,219,816 for angular measurement in target tracking radar systems. Jammer suppression using sum and difference signals is taught in U.S. Pat. Nos. 4,459,183 and 4,573,051 to Farina.

SUMMARY OF THE INVENTION

An objective of the invention is to provide a jam strobe resolution capability for monopulse antennas when there are two jammers in the main beam.

This invention is directed to a surveillance radar which can determine the angular positions of multiple jammers with the use of a monopulse antenna. It involves a method of collecting and processing jammer data received via a monopulse antenna, in order to determine jammer location, and to resolve two jammers within the main beam when present. A principal feature is the use of the ratio of the imaginary and real parts of the difference/sum ratio as a discriminant to select a subset of multiple measurement data points, from which the individual jammer angular locations can be determined, when two jammers are present, by averaging upper and lower percentiles of the real difference/sum ratio data points of that subset.

DETAILED DESCRIPTION

The invention is disclosed in a Final Technical Report RADC-TR-88-254, October 1988, Cost/Performance Trade-Off Study for Advanced Tactical Surveillance Radar (ATSR), by Joseph L. Henry and Raymond G. Martin of Westinghouse Electric Corporation, particularly on the four pages 3-111 to 3-114. The report is available from DTIC (Defense Technical Information Center) as AD-B132 021, and is hereby incorporated by reference.

RADAR SYSTEM

Figure 1:
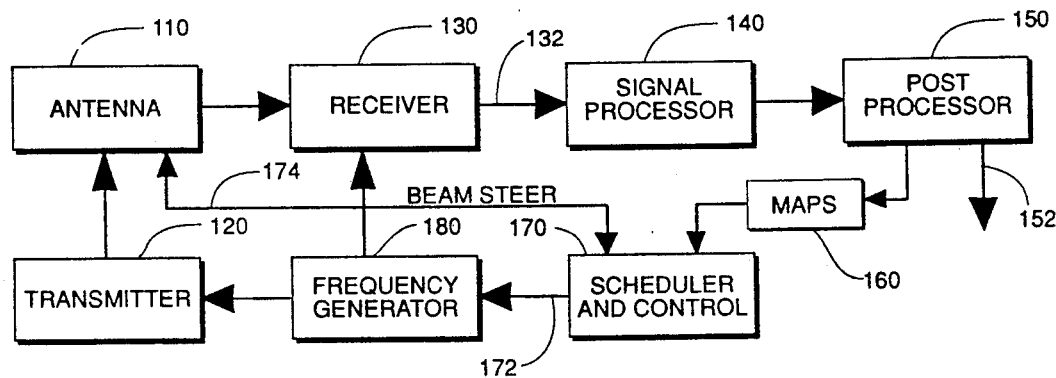
FIG. 1 is a block diagram of a radar system.

A block diagram of a radar system is shown in FIG. 1. The system operates at S-Band using a phase/phase scan array antenna 110 that provides either ±60° azimuth coverage when operated in a stationary mode or 360° coverage when rotating. The antenna 110 has input from a transmitter 120 and output to a receiver 130. Output from the receiver 130 is supplied to a signal processor 140, whose output is supplied to a post processor 150. Output from the post processor 150 is supplied via a line 152 to other systems, and also via a MAPS unit 160 to a scheduler and control unit 170. Output from the unit 170 via line 172 provides control of a frequency generator 180, whose output is supplied to the transmitter 120, and also to the receiver 130. Signals on a line 174 between the antenna 110 and the control unit 170 provide for beam steering.

"MAPS" in unit 160 are digitally stored maps defining, for example clutter levels and conditions as a function of range, azimuth and elevation position within the radar coverage, so that appropriate modes and processing methods can be employed in different regions of the coverage when the clutter conditions differ between regions. The data entered into the maps is derived dynamically from the radar clutter returns received from the different regions, and is updated periodically, at relatively slowly changing rates, as conditions change.

The antenna 110 is a monopulse agile beam type having a number of radiating elements in rows, with each element fed via a phase shifter.

The transmitter 120 incorporates a solid-state active aperture transmitter, implemented at the antenna row level. The rows are fed from equal power amplifier modules.

Target angular position data in both azimuth and elevation planes is obtained via monopulse using sum and difference receive beams. Frequency scan is used in some instances to achieve two simultaneous beam positions, each of which requires four receiver processor channels (see FIG. 2) comprising: (1) the sum beam; (2) the elevation difference beam; (3) the azimuth difference beam; and, (4) a sidelobe blanking (omni-directional) beam. A maximum of two simultaneous azimuth beam positions are used, with two-fold frequency diversity in that case, hence 16 receiver/processor channels are needed. In the threat sector region of the search coverage, and for dedicated track, only a single beam is employed, in which case four-fold frequency diversity is used, hence 16 receiver/processor channels are also needed for that situation.

RECEIVER

Figure 2:
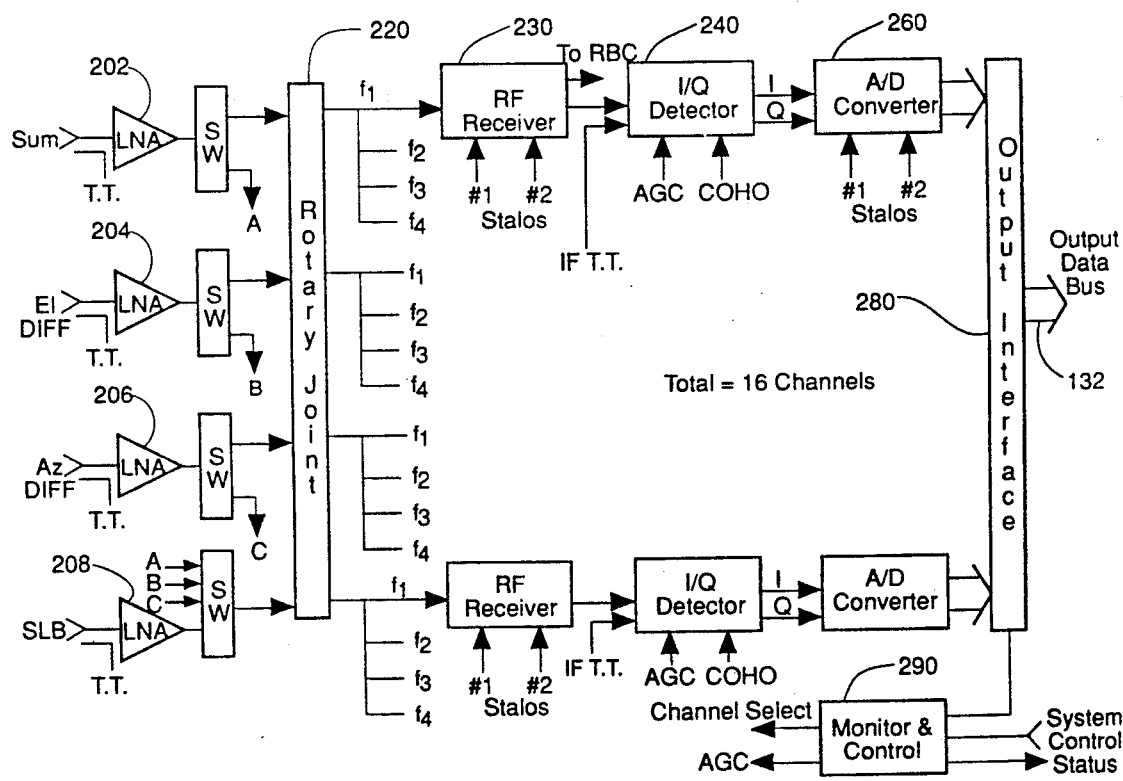
FIG. 2 is a block diagram of a receiver used in the system.

The block diagram of the receiver 130 is shown in FIG. 2. The multiple receiver channels are identical with only STALO (stable local oscillator) frequency varying, such that as shown in the block diagram, only one channel needs to be described. The sum, elevation, azimuth and sidelobe blanking beams from the antenna 110 are coupled to respective low noise amplifiers (LNA) 202, 204, 206 and 208, which are located above a rotary joint 220. Below the rotary joint, the LNA output signal is split into four RF receivers or downconverters.

In the channel for frequency f1 of the sum beam, the signal is supplied to a RF receiver section 230, where the signal is down converted in two stages to an intermediate frequency, controlled by STALO frequencies #1 and #2.

In a I/Q detector 240, the IF signals are amplified and synchronously converted to in-phase (I) and quadrature (Q) video signals by use of COHO (coherent oscillator) reference at 90° for the two video outputs. A variable attenuator (AGC) is included at the input of the I/Q detector to maintain the receiver noise output constant at one A/D count.

The A/D converter 260 has two sample-and-hold circuits, one for each video output, which are sampled simultaneously. The sampled signals are multiplexed in the A/D converter 260 providing 15-bit data to the digital processor 140 via a receiver interface 280 and a data bus 132. Output from the interface unit 280 is also supplied to a monitor and control unit 290 for channel selection and AGC control.

There are sixteen RF channels, namely four frequency channels (f1, f2, f3 & f4) for each of four different antennal beams (sum, elevation difference, azimuth difference, and SLB). Each RF channel, after down conversion and A/D sampling, produces two digital values, namely one I value and one Q value, each sampling interval. Thus, counting I and Q values separately, there is a total of 32 digital values generated each sampling interval.

ELECTRONIC COUNTER COUNTERMEASURES (ECCM)

A sidelobe blanker is used to protect against extraneous detections caused by repeater jamming in the antenna sidelobes. The objective is to achieve close to the ideal blanker performance in a clear (non-barrage jamming) environment while minimizing degradation in the presence of barrage jamming. This is achieved by the use of an "omni" pattern sidelobe blanking antenna and a normalized blanker algorithm in which the main and blanker channel outputs are normalized by the background barrage jamming level.

ECM Pre-Look

ECM pre-look is a passive (receive only) radar feature that performs three functions, under hostile operating conditions, namely:

1) Determines the least jammed frequencies to be used.

This will be accomplished on a beam-by-beam basis by inspecting the jamming levels present over the entire operating bandwidth prior to each look or pulse for which a frequency change is compatible with processing requirements.

2) For each dwell, determines whether or not main beam jamming is present, and if it is, generates jam strobes. This is accomplished by first comparing the jamming levels in the main beam channels with those in the sidelobe blanking and monopulse difference channels. When this process indicates main beam jamming, further processing of the measured data is used to generate jam strobes, including resolution of closely spaced jammers within the main beam, using the new algorithm according to the invention.

3) When excessively high main beam jamming levels are present at all frequencies in any particular beam position, the scheduled look is rescheduled, or aborted if overall time constraints so indicate.

Jammer Power Measurement

Figure 3:
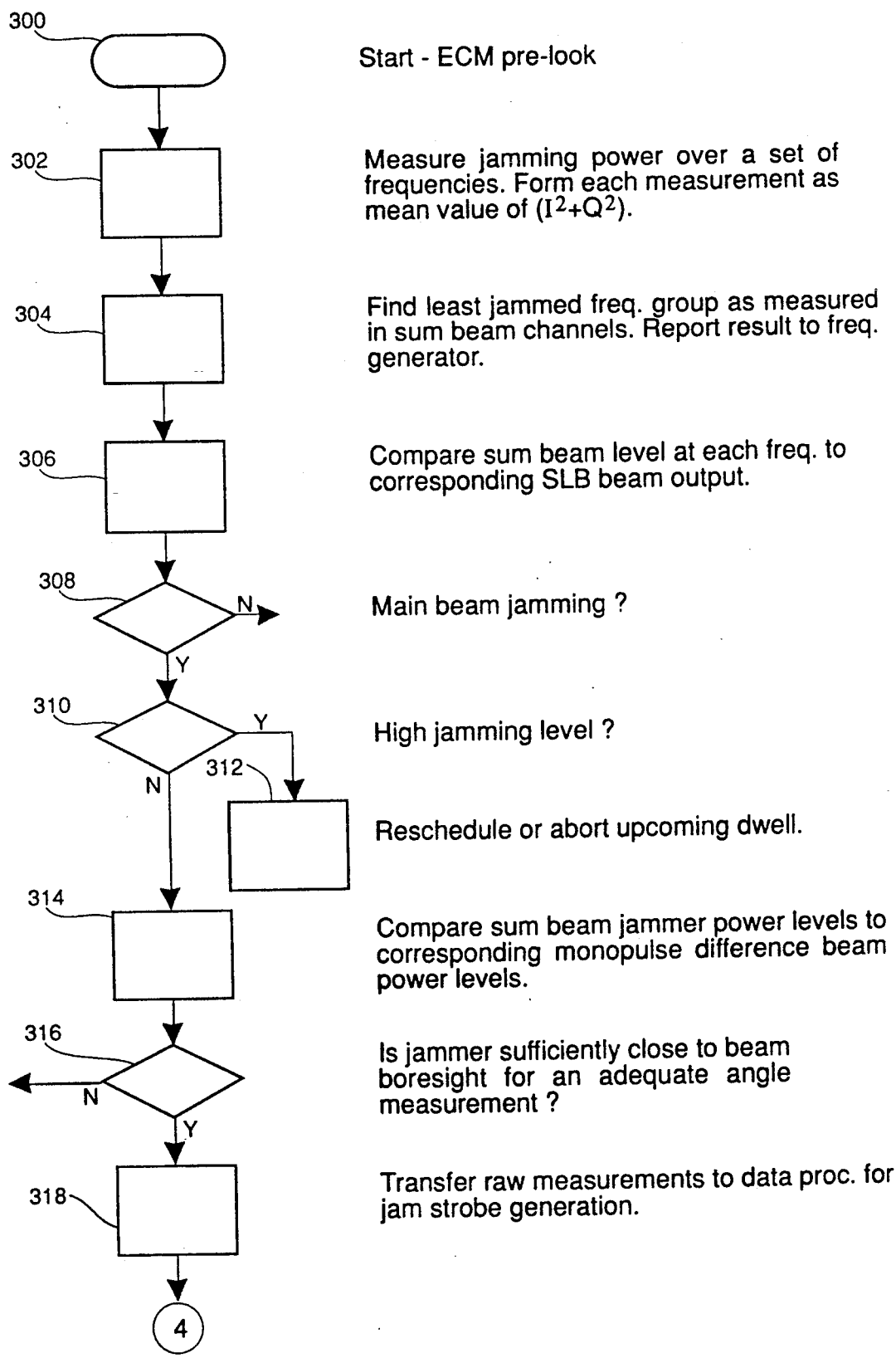
FIG. 3 is a flow chart for ECM pre-look processing.

FIG. 3 is a simplified flow chart of an embodiment for the ECM pre-look processing, starting at block 300.

As shown at block 302, each ECM pre-look performs jamming power measurements over a set of frequencies comprising 12 groups, with simultaneous frequencies per group, thus using the full capabilities of the 16 receiver channels and four STALOs incorporated in the radar. Each group of four frequencies comprises those appropriate to the next scheduled dwell. Each measurement will be formed by taking the mean of the received power, namely the mean value of $(I^2+Q^2)$, where I and Q are the measured A/D converter samples taken during each measurement interval.

The measurement process described above will be accomplished in the signal processor on a real time basis in each of the four antenna beam channels, at each of the four frequencies. At block 304, the signal processor also performs the function of finding the least jammed frequency group, as measured in the four sum beam channels, and reporting the resultant selection directly to the frequency generator for STALO selection during the upcoming dwell.

In addition to commanding the least jammed group selection for the next dwell, the signal processor also determines whether or not the beam, or beams, for that dwell are main beam jammed at any of the measured frequencies. This is accomplished for two purposes, first to initiate the jam strobe generation if appropriate, and second, in the case that the selected frequency group is main beam jammed, to determine whether the upcoming dwell should be rescheduled or aborted.

The main beam jamming determination is made in two steps. First, at block 306, the sum beam jamming level at each frequency is compared to the corresponding sidelobe blanking beam output. If this comparison shows the presence of main beam, rather than sidelobe, jamming and the jamming level is high, as indicated by a "yes" from each of the decision blocks 308 & 310, it is sufficient to indicate that the upcoming look should be rescheduled or aborted, as shown by block 312. However, it is not sufficient to indicate that an accurate jam strobe angle measurement can be made, because the jammer location can be well down on the shoulder of the main beam, outside the useful measurement of the monopulse beam cluster, yet still adequately strong to register as a main beam jammer relative to the sidelobe blanking beam.

Figure 4:
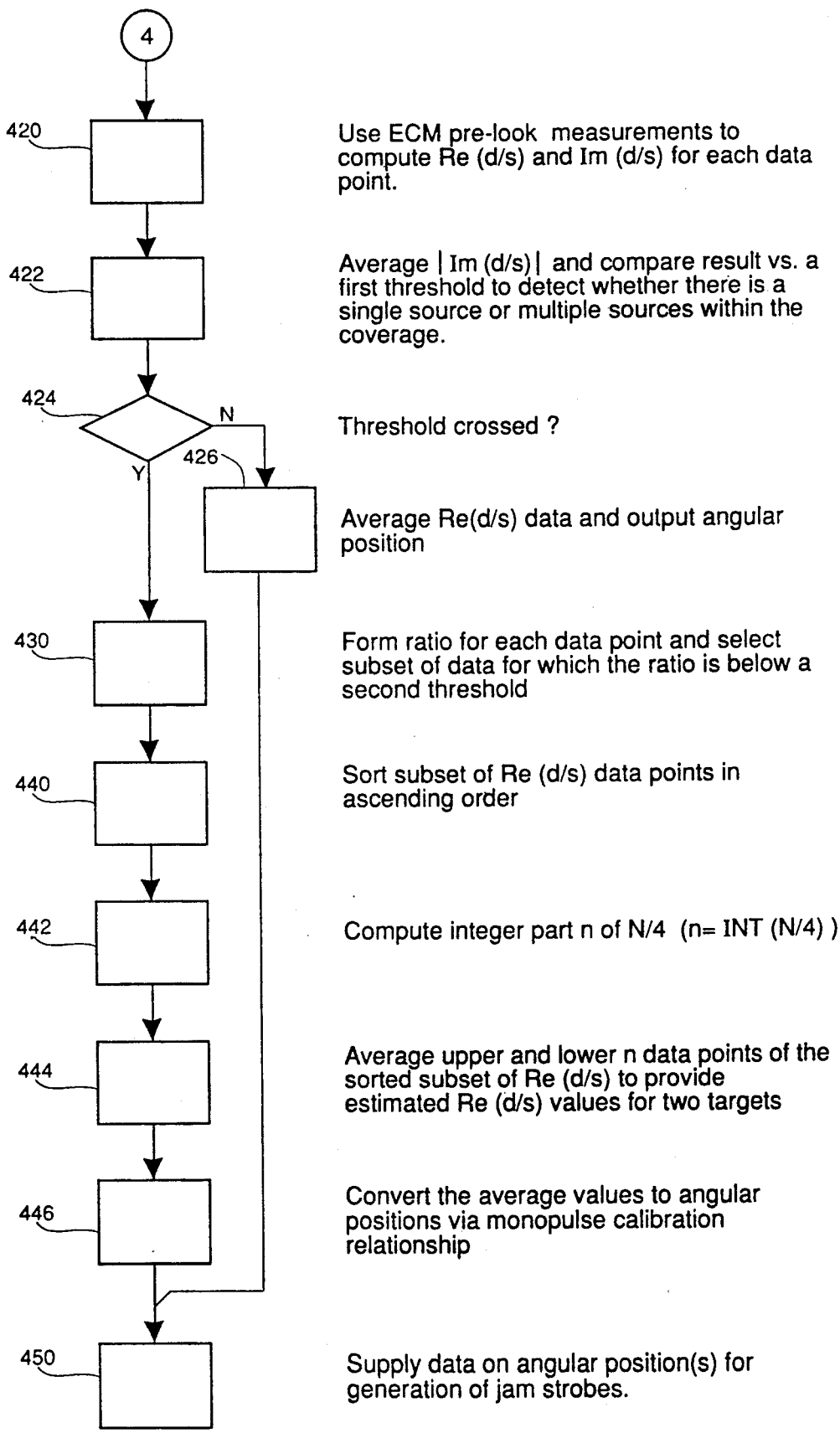
FIG. 4 is a flow chart for jam strobe resolution processing.

A further step is therefore taken at block 314 by comparing the sum beam jammer power levels to each of the corresponding monopulse difference beam power levels, to determine whether or not the jammer is sufficiently close to the beam boresight for an adequate angle measurement to be derived. When this condition is satisfied as represented by a "yes" output from decision block 316, the signal processor transfers all of the associated raw measurements to the data processor for jam strobe generation, as shown at block 318. The subsequent processing for jam strobe resolution is shown in FIG. 4.

Jam Strobe Generation

Whenever the process of jammer power measurement indicates the presence of main beam jamming, it is a relatively straight forward process to generate a jam strobe when only a single jammer is present. However, the specified jammer threat is such that two closely spaced mainlobe jammers within the main beam will be a frequently occurring situation. Conventional monopulse angle measurement techniques break down under these conditions. A new approach to this problem has been developed as described herein.

It is well known (Samuel M. Sherman, "Monopulse Principles and Techniques", Artech House, Chapter 8, Response to Unresolved Targets, section 8.10 on pages 219-222) that when two fluctuating sources are present within the coverage of a monopulse antenna, the average, or weighted average, of the indicated angle is at the so-called "power centroid" of the two sources. On the other hand, if one source is consistently stronger than the other, the unweighted average indicated angle is that of the stronger source.

Another well-known characteristic of monopulse systems is that the presence of multiple, rather than single, sources within the coverage can be detected (Sabi J. Asseo, Detection of Target Multiplicity using Monopulse Quadrature Angle, IEEE Trans. AES-17, No. 2, March 1981, pp. 271-280) by the measurement of the imaginary part of the difference/sum ratio $Im(d/s)$, as well as the real part, $Re(d/s)$. $Re(d/s)$ is normally used to calculate the source angle, via the appropriate d/s vs. angle calibration relationship. However, if $Im(d/s)$ is large under high signal-to-noise ratio conditions, the presence of multiple sources is indicated and $Re(d/s)$ is not a good direct measure of their locations.

The sum and difference signals are each represented as complex digital quantities, namely each quantity comprises a real (I) component plus an imaginary (Q) component, forming an ordered pair of numbers, usually represented in the form $I+jQ$. Thus, we can write $d = I_d + jQ_d$ and $S = I_S + jQ_S$. The quantity $$Re(d/s) = Re\left[\frac{d \cdot S^*}{|S|^2}\right],$$

whose $S^* = I_S - jQ_S$ is equal to $$Re\left[\frac{I_d + jQ_d}{I_S + jQ_S}\right] = Re\left[\frac{(I_d + jQ_d)(I_S - jQ_S)}{I_S^2 + Q_S^2}\right] =$$

$$Re\left[\frac{(I_d I_S - Q_d Q_S) + j(Q_d I_S - I_d Q_S)}{I_S^2 + Q_S^2}\right] = \frac{I_d I_S - Q_d Q_S}{I_S^2 + Q_S^2}$$

Similarly, $Im(d/s) = Im\left[\frac{d \cdot S^*}{|S|^2}\right]$, or equivalently, $$Im(d/s) = \frac{Q_d I_S - I_d Q_S}{I_S^2 + Q_S^2}$$

The jammer resolution approach described herein makes use of the above principles and others, in a novel combination, to provide the capability of resolving two jammers with good probability when they are both within the main beam coverage and of reasonably comparable strengths. Of course, it is not in general known a priori whether there are one or two jammers present, hence the method must, and does, make that decision, and provides the appropriate angular position output(s).

Mainbeam jammers, as typically specified in current threats, provide very high signal-to-noise ratios (e.g. 40 dB or more) so that not only is thermal noise not a significant contributor to the composite signal, but also the jammers provide appreciable signal levels, even when positioned well down on the antenna beam skirts, or into the sidelobes. In order to ensure meaningful measurements it is therefore necessary to require not only that the sum channel signal level exceed that of a suitable sidelobe blanking channel, but also that it exceed the difference channel signal level, thereby ensuring, at least in the single jammer case, that the jammer is located in the sensitive region of the monopulse system, approximately within the 3 dB sum beamwidth for typical monopulse antenna patterns. This type of preprocessing of each measurement data point is therefore employed in the disclosed method.

It will be assumed that multiple measurements are made on each jam strobe determination look. This is reasonable since the jam strobe function is typically combined with ECM pre-look functions that seek to find jam-free frequency channels that must make multiple looks in order to estimate the jamming level with reasonable accuracy, especially in the more usual cases where the beam pointing direction is such that the jammer(s) are in the antenna sidelobes. For example, 60 measurements are necessary to give approximately 1 dB jamming level accuracy with 95% confidence. However, since the jamming can be assumed to be broadband relative to the bandwidth of the radar receiver, these measurements can be made on successive A/D converter samples of the receiver outputs, and can thus be accomplished in relatively short times. Further, it is assumed that all measurements for a particular look are made as a batch and are stored in memory for subsequent processing. The processing for jam strobe resolution is shown in the flow chart of FIG. 4.

First, as shown at block 420, the ECM pre-look measurements are used to compute the real part Re(d/s), and the imaginary part Im(d/s), of the difference/sum ratio for each of the data points. Then at block 422, the absolute value of the imaginary part |Im(d/s)| is averaged and the result compared against a suitable threshold to detect whether there is a single source or multiple sources within the coverage. Threshold excession indicates multiple sources. Clearly, the appropriate threshold level depends on the specific monopulse antenna beam patterns. For a typical set of patterns used in a simulation of this process a threshold value of 0.25 was found to work well.

If the |Im(d/s)| threshold is not crossed, represented by a "no" output from the decision block 424, indicating a single target present, then the Re(d/s) data is averaged at block 426 and used to output the angular position of that target via block 450, completing the process in that case. Otherwise the process proceeds from the "yes" output of block 424 on the assumption that two targets are present.

The next step at block 430 is then to form the |Im(d/s)/Re(d/s)| ratio for each data point, or alternatively |Im(d/s)| alone, and to select that subset of the data for which this ratio is below a second, different threshold. Simulation showed that a threshold level of 0.35 was a reasonable choice for the antenna patterns assumed when the |Im(d/s)/Re(d/s)| ratio was used. The resulting data subset represents those data points for which the two sources had fluctuated such that one of the sources was significantly stronger than the other. Of course, it is not known at that stage of the process, for any particular Re(d/s) data point in the subset, which of the two targets is the stronger. However, it can be presumed that the subset Re(d/s) data points come from a bimodal distribution, tending to cluster about each of the two values corresponding to the angular locations of the two sources. A reasonable estimate of these locations is therefore given by the averages of suitable upper and lower percentiles of the subset Re(d/s) data points. Simulation showed a good choice to be those above and below the upper and lower quartiles respectively.

The next step in the process at block 440 is therefore to take the selected subset of Re(d/s) data points and sort them in ascending numerical order. Finally at block 442, assuming the number of data points in the subset to be N, the integer part, n, of N/4 is computed (i.e. n=INT (N/4)), and the upper and lower n data points of the sorted subset of Re(d/s) are then averaged at block 444 to provide the estimated Re(d/s) values for the two targets. Then at block 446 the average values are converted to angular positions via the monopulse calibration relationship in the usual manner, and used to output the angular positions of those target via block 450 for generation of jam strobes.

Clearly, the specific choices of thresholds discussed above and the specific definition of n, are not intended as the only possible choices, and other values may be appropriate depending on the particular antenna patterns used.

Figure 5:
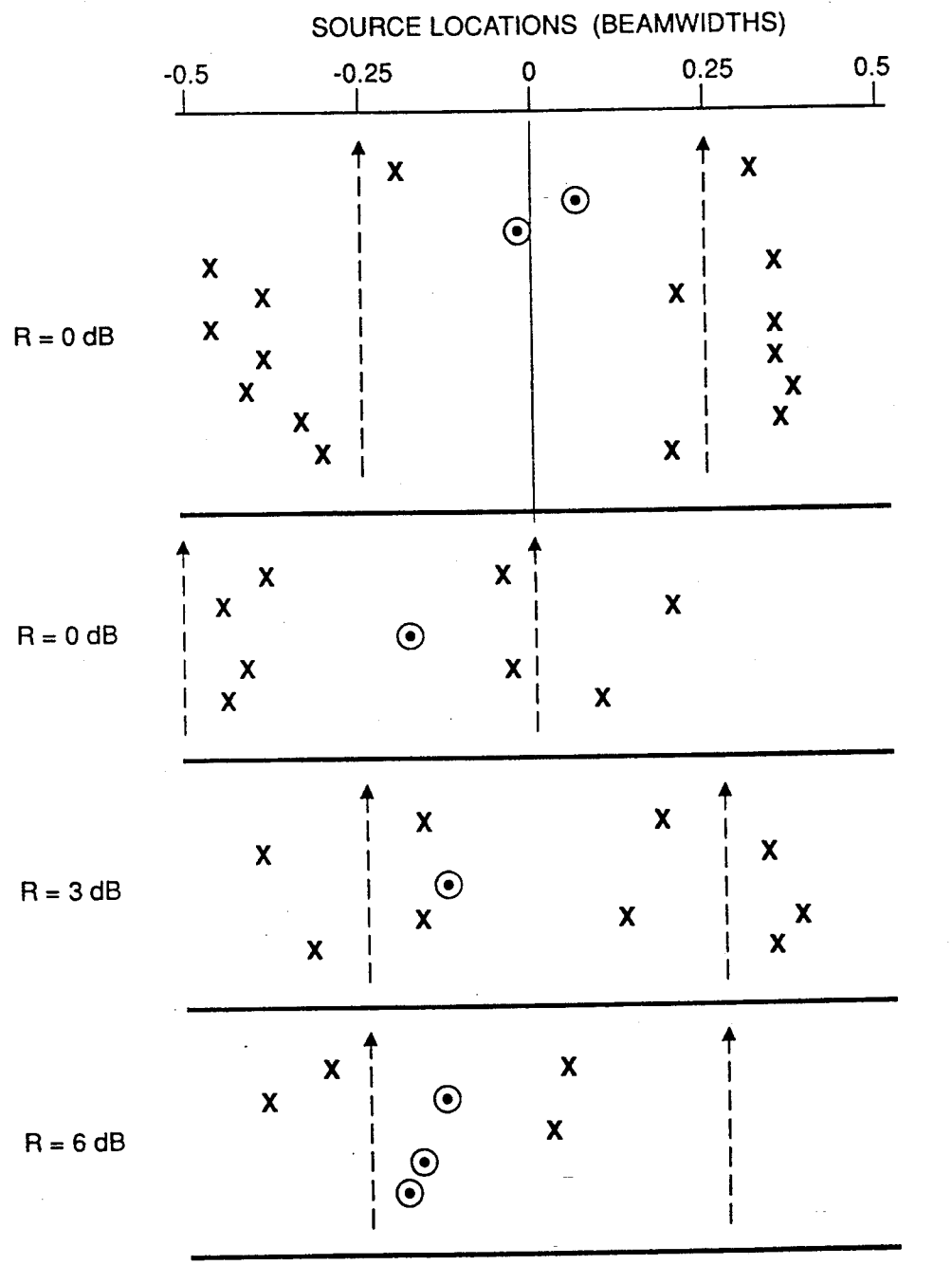
FIG. 5 is a diagram showing results of resolving jammers in a simulation.

As already noted, a digital computer simulation of the process was carried out and the different jammer positions and relative strengths were investigated. In general, it was found to be possible to resolve two fluctuating (Sw.2) jammers at either 0.5 or 0.25 beamwidth spacings when their power levels were within about 3 dB of each other, but that resolution became much more difficult at 6 dB power differences. FIG. 5 shows the specific results obtained on a limited number of trials. Sixty measurements were used for each trial.

A principal feature of the invention lies in the use of the monopulse Im(d/s) ratio as a discriminant to select useful measurement data points to aid in resolving two jamming sources and in the combination of this procedure with previously known averaging processes for locating fluctuating source positions.

It is understood that certain modifications to the invention as described may be made, as might occur to one with skill in the field of the invention, within the scope of the appended claims. Therefore, all embodiments contemplated hereunder which achieve the objects of the present invention have not been shown in complete detail. Other embodiments may be developed without departing from the scope of the appended claims.

What is claimed is:

1. The method of resolving jammers in a radar system using a monopulse antenna, in which output signals from the monopulse antenna are combined to provide sum and difference signals, which are processed via coherent detector means to provide in-phase and quadrature values and converted to digital form, wherein a passive ECM pre-look operation comprises processing the in-phase and quadrature values to provide measurements for a plurality of data points for a dwell, in which the ECM pre-look operation includes a determination of whether or not main beam jamming is present;

wherein said method of resolving jammers is operative in response to a determination during an ECM pre-look operation that main beam jamming is present, and comprises the steps:

using said ECM pre-look measurements to compute real and imaginary parts for each data point of a set of said data points; and computing an average value of the imaginary difference-to-sum ratio Im(d/s) and comparing said average value against a first threshold value to detect whether there is a single source or multiple sources of the main beam jamming, with an indication that there are multiple sources being provided in response to exceeding the first threshold;

responsive to said indication that there are multiple sources, forming a ratio of the imaginary and real parts of the difference/sum ratio (|Im(d/s)/Re(d/s)|), selecting a data subset for which said ratio of the imaginary and real parts of the difference/sum ratio is below a second threshold, the second threshold being different from the first threshold, and using the real part of the difference/sum ratio (re(d/s)) of that data subset as a selected subset of N data points;

sorting the selected subset of N Re(d/s) data points in ascending numerical order;

computing the integer part n of N/4, selecting the n upper and the n lower data points as upper and lower quartile subsets respectively;

computing the average values of each of the upper and lower quartile subsets to provide estimated Re(d/s) values for two jammers;

converting the average values for the two jammers to angular positions via a monopulse calibration relationship; and supplying data on said angular positions for generation of jam strobes.

2. The method of resolving jammers in a radar system using a monopulse antenna, in which output signals from the monopulse antenna are combined to provide sum and difference signals, which are processed via coherent detector means to provide in-phase and quadrature values and converted to digital form, wherein a passive ECM pre-look operation comprises processing the in-phase and quadrature values to provide measurements for a plurality of data points for a dwell, in which the ECM pre-look operation includes a determination of whether or not main beam jamming is present;

wherein said method of resolving jammers if operative in response to a determination during an ECM pre-look operation that main beam jamming is present, and comprises the steps:

using said ECM pre-look measurements to compute real and imaginary parts for each data point of a set of said data points; and computing an average value of the imaginary difference-to-sum ratio Im(d/s) and comparing said average value against a first threshold value to detect whether there is a single source or multiple sources of the main beam jamming, with an indication that there are multiple sources being provided in response to exceeding the first threshold;

responsive to said indication that there are multiple sources, using the imaginary part of the difference/sum ratio (Im(d/s)) to select a data subset below a second threshold, the second threshold being different from the first threshold, and using the real part of the difference/sum ratio (Re(d/s)) of that data subset as a selected subset of N data points:

sorting the selected subset of N Re(d/s) data points in ascending numerical order;

selecting upper and lower subsets as a given percentage of the N Re(d/s) data points respectively;

computing the average values of each of the upper and lower subsets to provide estimated Re(d/s) values for two jammers;

converting the average values for the two jammers to angular positions via a monopulse calibration relationship; and supplying data on said angular positions for generation of jam strobes.

* * * * *

UNITED STATES PATENT AND TRADEMARK OFFICE
CERTIFICATE OF CORRECTION

PATENT NO. : 5,101,209
DATED : March 31, 1992
INVENTOR(S) : Raymond G. Martin

It is certified that error appears in the above-identified patent and that said Letters Patent is hereby corrected as shown below:

Column 2, line 8, a period should follow "No".
Column 9, line 2, "(re(d/s))" should read --(Re(d/s))--.
Column 9, line 31, (claim 2), "if" should read --is--.
Column 10, line 19, the colon should be a semicolon.

Signed and Sealed this

Seventh Day of September, 1993

Attest:

BRUCE LEHMAN

Attesting Officer

Commissioner of Patents and Trademarks